W. OFFERMAN.
PIPE THREADING MACHINE.
APPLICATION FILED APR. 1, 1914.

1,144,333.

Patented June 22, 1915.
2 SHEETS—SHEET 1.

Witnesses:

Inventor,
William Offerman,
by 
Attorney

W. OFFERMAN.
PIPE THREADING MACHINE.
APPLICATION FILED APR. 1, 1914.

1,144,333.

Patented June 22, 1915.
2 SHEETS—SHEET 2.

Witnesses:
James T. Law
Hugh H. Senior

Inventor,
William Offerman,
by Samuel W. Balch
Attorney

THE NORRIS PETERS CO., PHOTO-LITHO., WASHINGTON, D. C.

UNITED STATES PATENT OFFICE.

WILLIAM OFFERMAN, OF YONKERS, NEW YORK, ASSIGNOR TO D. SAUNDERS' SONS, OF YONKERS, NEW YORK, A CORPORATION OF NEW YORK.

PIPE-THREADING MACHINE.

1,144,333.  Specification of Letters Patent.  Patented June 22, 1915.

Application filed April 1, 1914. Serial No. 828,688.

*To all whom it may concern:*

Be it known that I, WILLIAM OFFERMAN, a citizen of the United States of America, and a resident of Yonkers, county of Westchester, and State of New York, have invented certain new and useful Improvements in Pipe-Threading Machines, of which the following is a specification.

The object of this invention is to provide a machine suitable for cutting off and threading cast-iron pipe.

Pipe threading machines have heretofore been organized chiefly for such operations on wrought-iron pipe and as so organized are found to be unsuited in several respects to the threading of cast-iron. Wrought-iron pipe is true to size while cast-iron pipe is irregular and requires to be trued, and has scale, which if cut into by the threading dies would quickly destroy them, and requires to be cut away first by a more easily renewed and less expensive turning tool. Furthermore, the usual form of thread with a sharp top and bottom which may be cut in wrought-iron cannot be smoothly cut in cast-iron, as the sharp corners would break. This necessitates the substitution of a form of thread with a flat top and bottom, and a die formed to cut this form of thread is not self feeding so that it becomes necessary to provide the machine with a lead screw to feed the carriage.

A further object of the invention is therefore to properly equip a pipe-threading machine with such a lead screw while retaining the compact and substantial proportions of frame and parts which have become standardized for pipe-threading machines designed to operate on wrought-iron.

Figure 1:
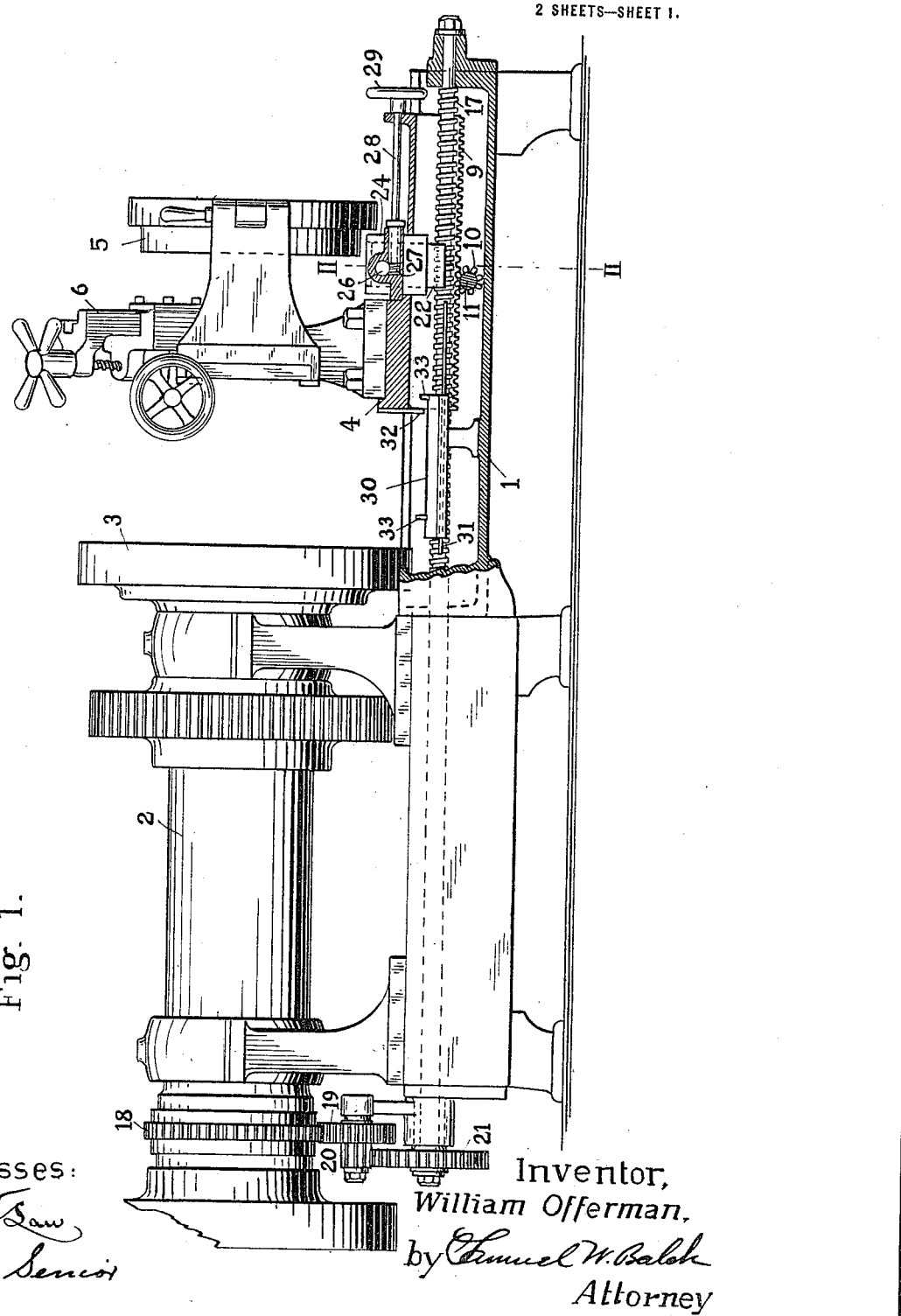
Figure 1:
Figure 2:
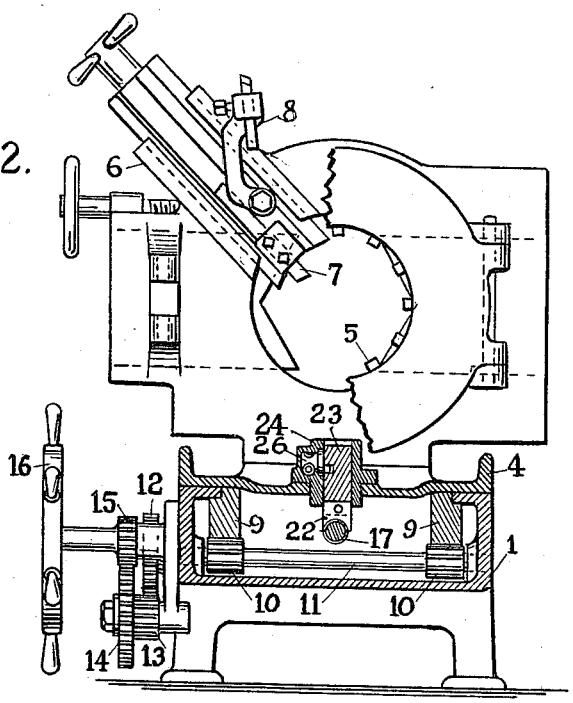
Figure 3:
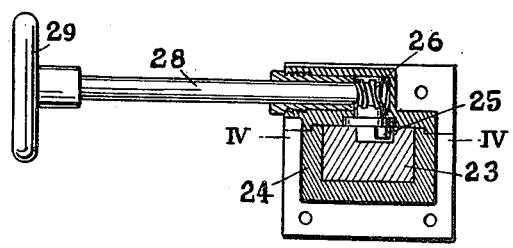
Figure 4:
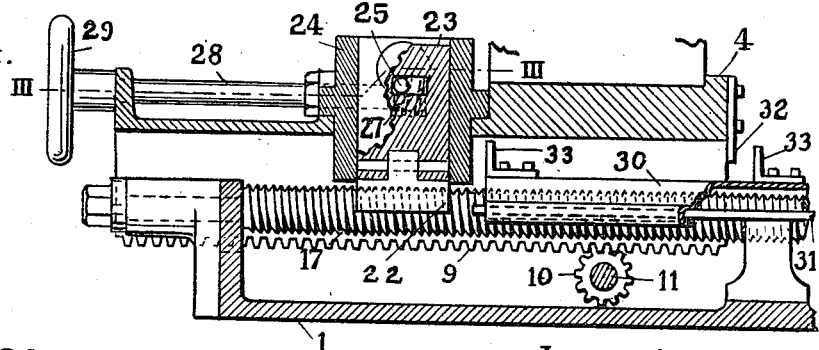

In the accompanying two sheets of drawings which form a part of this application—Figure 1 is a side elevation, broken away, of a pipe-threading machine embodying my invention. Fig. 2 is a vertical section through the base of the machine on the line II—II of Fig. 1. Fig. 3 is a horizontal section through the feed releasing mechanism on the line III—III of Fig. 4. Fig. 4 is a vertical section through the feed releasing mechanism and base of the machine on the line IV—IV of Fig. 3.

The pipe machine comprises the frame 1 which carries a hollow spindle 2 with a chuck 3, and a die-carriage 4 with a die 5 and cutting-off slide 6. The slide carries the usual cutting-tool 7 and in addition carries through a pivoted holder 8 a second tool for turning off the outside of the pipe from the end back as far as the thread is to be cut. This holder is folded back as shown in Fig. 2 when the cutting-off tool is to be used, and forward when the turning tool is to be used. Both tools can thus be kept clamped in the machine and either brought into operative position as desired.

The carriage has the usual hand feed by which it can be quickly brought to any position. This comprises two racks 9 9 carried by the carriage and engaged by two pinions 10 10 carried by a transverse shaft 11 journaled in the frame and operated through a gear train 12, 13, 14, 15 from a hand wheel 16. The transverse shaft is placed as low as possible in the frame thereby leaving room above it in the center line of the machine between its ways for a feed screw 17. The spindle through a change-gear train 18, 19, 20, 21 drives this feed screw. A half-nut 22 carried by the carriage engages the feed screw when the feed is to be on. This nut is pinned to a shank 23 which projects up through a gear case and guide 24. This is bolted over a hole through the floor of the carriage. A transverse slot in the shank is engaged by a crank 25 which is carried by a worm-gear 26, and the worm-wheel is engaged by a worm 27 at one end of a shaft 28. This shaft lies parallel to the axis of the machine and at its outer end carries a hand wheel 29 by the operation of which the half-nut is thrown into and out of engagement from a convenient position. In addition to being thrown out of engagement with the lead screw the half-nut can be lifted high enough to clear the outboard bearing of the lead screw to permit the removal of the carriage from the machine. When the nut is in engagement the crank is on the dead center and thereby locked against being crowded off by the straining of the machine, and the worm gear transmission serves also to secure the nut in this position and also in any other position.

The portion of the lead screw which underlies the space between the carriage and the chuck is protected by a cover 30 which is supported by guide rods 31 31 on either side of the lead screw. A tappet 32 attached to the carriage engages tappets 33 33 to slide the cover as required to protect the screw from falling chips.

What I claim as new, and desire to secure by Letters Patent of the United States, is—

1. The combination in a pipe-threading machine with means for rotating pipe, of a die-carrying carriage movable in line with the axis of the pipe, a lead screw beneath the carriage, means for turning the lead screw from the pipe rotating means, a half-nut for engagement with the lead screw, a shank for the nut carried by the carriage and projecting through the floor thereof, a crank engaging with the shank above the carriage floor, a worm and worm-wheel for turning the crank, and a shaft and hand wheel for operating the worm, substantially as described.

2. The combination in a pipe-threading machine with means for rotating pipe, of a die-carrying carriage movable in line with the axis of the pipe, a lead screw beneath the carriage, means for turning the lead screw from the pipe rotating means, a half-nut for engagement with the lead screw, a shank for the nut carried by the carriage and projecting through the floor thereof, a worm-wheel, connections between the worm-wheel and shank located above the floor of the carriage for moving the nut into and out of engagement with the lead screw, a worm engaging with the worm-wheel, a shaft parallel with the axis of the machine for operating the worm and a hand wheel for the shaft, substantially as described.

Signed by me at Yonkers, New York, this 30th day of March, 1914.

WILLIAM OFFERMAN.

Witnesses:
WM. H. A. HOLMES,
WILLIAM B. FINK.

Copies of this patent may be obtained for five cents each, by addressing the "Commissioner of Patents, Washington, D. C."